(12) United States Patent
Aguilar, Jr. et al.

(10) Patent No.: US 7,984,075 B2
(45) Date of Patent: *Jul. 19, 2011

(54) ASYNCHRONOUS LINKED DATA STRUCTURE TRAVERSAL

(75) Inventors: Maximino Aguilar, Jr., Georgetown, TX (US); Michael Norman Day, Round Rock, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/147,540

(22) Filed: Jun. 27, 2008

(65) Prior Publication Data

US 2008/0263091 A1 Oct. 23, 2008

Related U.S. Application Data (63) Continuation of application No. 11/204,415, filed on Aug. 16, 2005, now Pat. No. 7,421,453.

(51) Int. Cl.
    *G06F 17/30* (2006.01)
(52) U.S. Cl. ........ 707/802; 707/797; 707/800; 707/803; 707/807
(58) Field of Classification Search .................. 707/609, 707/790–792, 795, 802–803, 809–810, 796, 707/797, 798, 800, 807; 711/148–153
    See application file for complete search history.

(56) References Cited

U.S. PATENT DOCUMENTS

| | | | | |
|---|---|---|---|---|
| 4,794,528 A | * | 12/1988 | Hirose et al. ........................ | 1/1 |
| 5,557,786 A | * | 9/1996 | Johnson, Jr. ........................ | 1/1 |
| 5,561,786 A | * | 10/1996 | Morse .............................. | 711/170 |
| 5,805,860 A | * | 9/1998 | Parham ............................ | 716/101 |
| 6,380,947 B1 | * | 4/2002 | Stead .............................. | 345/645 |
| 6,907,414 B1 | * | 6/2005 | Parnell ............................. | 706/47 |
| 6,978,271 B1 | | 12/2005 | Hoffman et al. .................... | 707/101 |
| 7,650,460 B2 | * | 1/2010 | Cheriton .......................... | 711/108 |

(Continued)

FOREIGN PATENT DOCUMENTS

| | | | |
|---|---|---|---|
| WO | WO 2004006067 | * | 1/2004 |
| WO | WO 2004097673 | * | 11/2004 |

OTHER PUBLICATIONS

J. Morris Chang, "An e• cient data structure for dynamic memory management", The Journal of Systems and Software 54 (2000) 219±226.*

(Continued)

*Primary Examiner* — Srirama Channavajjala
(74) *Attorney, Agent, or Firm* — VanLeeuwen & VanLeeuwen; Matthew B. Talpis (57) ABSTRACT

Asynchronously traversing a disjoint linked data structure is presented. A synergistic processing unit (SPU) includes a handler that works in conjunction with a memory flow controller (MFC) to traverse a disjoint linked data structure. The handler compares a search value with a node value, and provides the MFC with an effective address of the next node to traverse based upon the comparison. In turn, the MFC retrieves the corresponding node data from system memory and stores the node data in the SPU's local storage area. The MFC stalls processing and sends an asynchronous event interrupt to the SPU which, as a result, instructs the handler to retrieve and compare the latest node data in the local storage area with the search value. The traversal continues until the handler matches the search value with a node value or until the handler determines a failed search.

6 Claims, 6 Drawing Sheets

U.S. PATENT DOCUMENTS

2004/0024729 A1* 2/2004 Worley ............................. 707/1
2004/0103086 A1  5/2004 Vinnakota et al. ................. 707/3
2005/0060460 A1* 3/2005 Karamatas et al. ........... 710/260
2005/0131867 A1  6/2005 Wilson .............................. 707/3
2008/0133841 A1* 6/2008 Finkler ......................... 711/144

OTHER PUBLICATIONS

Sih et al., "A Compile-Time Scheduling Heuristic for Interconnection-Constrained Hetergeneous Processor Architectures," Feb. 2, 1993, IEEE, pp. 175-186.

* cited by examiner

ASYNCHRONOUS LINKED DATA STRUCTURE TRAVERSAL

This application is a continuation application of U.S. Non-Provisional patent application Ser. No. 11/204,415, entitled "Asynchronous Linked Data Structure Traversal," filed on Aug. 16, 2005.

BACKGROUND OF THE INVENTION

1. Technical Field

The present invention relates in general to a system and method for asynchronous linked data structure traversal. More particularly, the present invention relates to a system and method for asynchronously traversing a disjoint linked data structure using a handler while a main program executes concurrently.

2. Description of the Related Art

Computer systems typically use data structures for organizing and storing data. For example, a general data structure type may be an array, a file, a record, a table, or a tree. Data structures are designed to organize data that suits a specific purpose so that it is accessible and easily utilized. In computer programming, a data structure may be selected or designed to store data for the purpose of utilizing the data structure using various algorithms.

A linked list, or linked data structure, is one of the fundamental data structures used in computer programming. A linked data structure includes nodes whereby each node includes information (data) and "links" to other nodes. One One type of linked data structure is a binary tree, which contains nodes that include data and two links to "child" nodes. A "parent" node's "left" link points to a child node whose data value is less than the parent node's data value, and the parent node's "right" link points to a child node whose data value is greater than the parent node's data value. Linked data structures allow a computer system to easily locate and process a particular node.

A challenge found is that linked data structures typically reside in non-contiguous memory. Meaning, node storage areas are typically spread over the computer system's memory area, especially nodes that are dynamically added. This causes a processor to use a call stack in order to track and locate node data locations.

Another challenge found is that a device traverses a linked data structure and processes the data in a serial manner, which results in data transfer latencies that bind a program's performance. With simple data structures whose element locations are known, a technique known as double-buffering (multi-buffering) may hide transfer latencies. However, when traversing linked data structures (e.g., binary trees), this kind of latency hiding technique is not effective.

Furthermore, a challenge found with traversing a linked data structure is that it may create problems with devices that have limited memory space. For example, if a limited memory space device traverses a large linked data structure, the call stack may become larger than the limited memory space and, therefore, the device may not be able to complete the linked data structure traversal.

What is needed, therefore, is a system and method to asynchronously traverse a linked data structure using a limited memory space.

SUMMARY

It has been discovered that the aforementioned challenges are resolved using a system and method for asynchronously traversing a disjoint linked data structure using a handler that allows a main program to execute concurrently. A synergistic processing unit (SPU) includes a handler that works in conjunction with a memory flow controller (MFC) to traverse a disjoint linked data structure. The handler compares a search value with a node value, and provides the MFC with an effective address of the next node to traverse based upon the comparison. In turn, the MFC retrieves node data from system memory and stores the node data in the SPU's local storage area. The MFC suspends processing and sends an asynchronous event interrupt to the SPU. As a result, the SPU instructs the handler to retrieve and compare the latest node data in the local storage area with the search value. The traversal continues until the handler matches the search value with a node value or until the handler determines a failed search.

Upon initialization, the SPU's program determines the number of nodes in the linked data structure and identifies the linked data structure's parent node. The program then stores the parent node's effective address in the first element that is located in a DMA list. In addition, the program sets the DMA list element's notification flag that instructs the MFC to stall execution and notify the SPU when the MFC retrieves parent node data from system memory. In one embodiment, each DMA list element includes two fields, which are a transfer size field and an effective address field. In this embodiment, the notification flag may be one may be one of the bits included in the transfer size field, such as bit 31.

The SPU sends a "GET" command to the MFC which, in turn, retrieves the parent node effective address from the DMA list. As such, the MFC retrieves the corresponding parent node data from system memory and stores the parent node data in the SPU's local storage area. The MFC detects that the notification flag was set and, therefore, stalls processing and sends an asynchronous event interrupt to the SPU.

The SPU receives the asynchronous event interrupt and, in one embodiment, the SPU saves the program's current program counter, disables asynchronous interrupts, and branches to an interrupt vector, which is the location of the handler's software code. The handler retrieves the parent node data from the local storage area, and compares the parent node's value, such as "4324," with a search value, such as "9583." The handler determines whether the node value matches the search value. If the node value matches the search value, the handler informs the program and terminates the linked data structure traversal.

On the other hand, if the node value does not match the search vale, the handler determines whether the search value is greater than or less than the node value. When the handler determines that the search value is greater than the node value, the handler selects a "right" child node effective address, which is included in the parent node data, in order to continue the traversal. When the handler determines that the search value is less than the node value, the handler selects a "left" child node effective effective address, which is included in the parent node data, in order to continue the traversal. The handler stores the appropriate child node effective address in the next DMA list element and sets its notification flag. In turn, the SPU sends an acknowledgement to the MFC to resume "GET" command execution.

The MFC retrieves the child node effective address from the DMA list, and retrieves the corresponding child node data. The MFC stores the child node data in the local storage area, stalls processing, and sends another asynchronous event interrupt to the SPU. As a result, the handler retrieves the child node data from the local storage area and compares its node value with the search value. The handler and the MFC continue to traverse the linked data structure using asynchronous event interrupts until the handler matches a node value with the search value or the handler determines a failed search.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
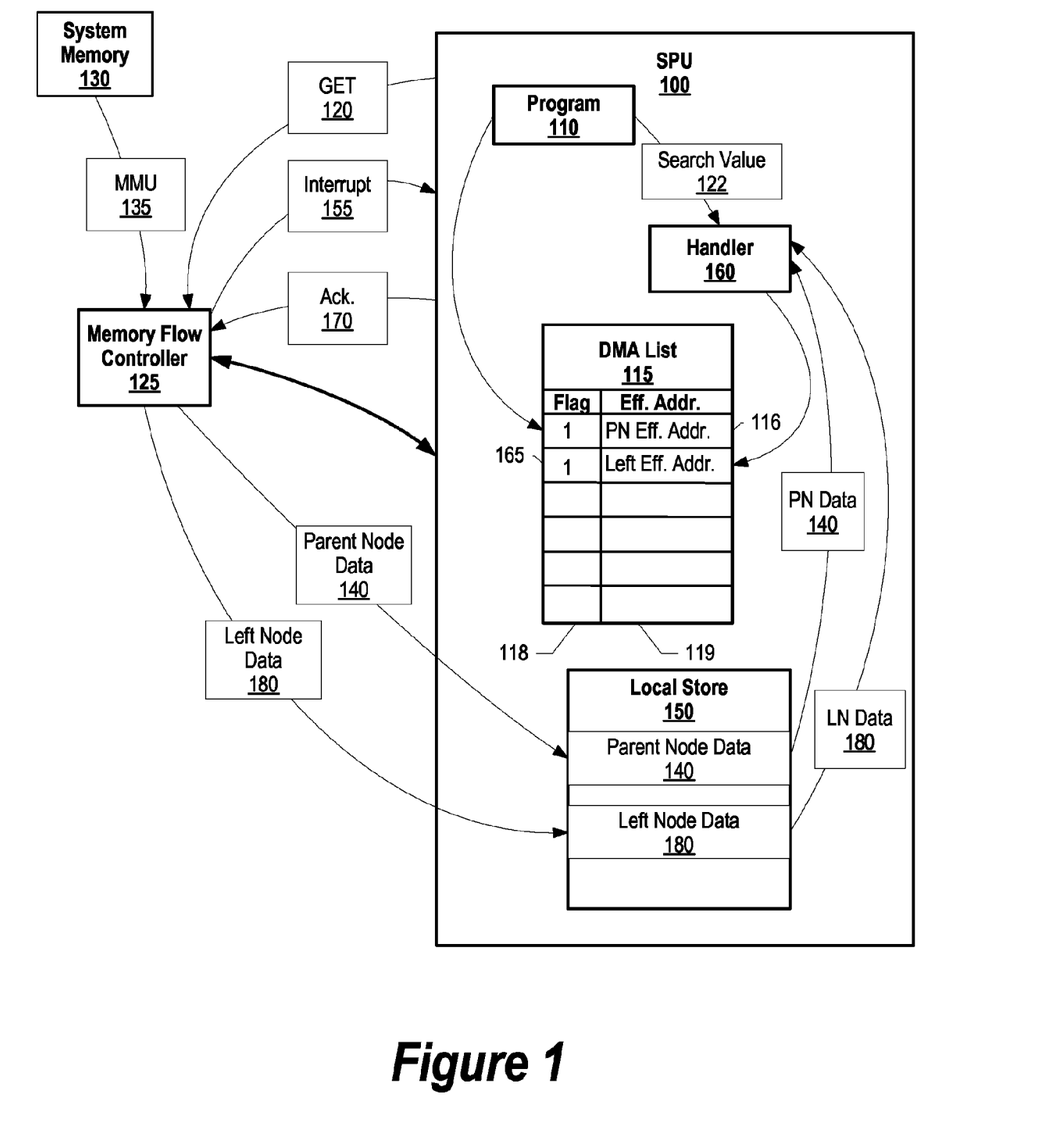
FIG. 1 is a diagram showing a synergistic processing unit (SPU) working in conjunction with a memory flow controller (MFC) to traverse a linked data structure.

FIG. 1 is a diagram showing a synergistic processing unit (SPU) working in conjunction with a memory flow controller (MFC) to traverse a linked data structure. SPU 100 is preferably a single instruction, multiple data (SIMD) processor, such as a digital signal processor, a microcontroller, a microprocessor, or a combination of these cores. In a preferred embodiment, SPU 100 includes a local memory, registers, four floating point units, and four integer units. As one skilled in the art can appreciate, depending upon the processing power required, SPU 100 may include a greater or lesser number of floating points units and integer units.

SPU 100 includes program 110, handler 160, DMA list 115, and local store 150. Program 110 invokes the linked data structure traversal that, in turn, handler 160 traverses. Handler 160 (e.g., a software subroutine) stores node effective addresses in DMA list 115 that MFC 125 accesses in order to retrieve corresponding node data from system memory 130 at a first memory location. In turn, MFC 125 stores the node data in local store 150 for handler 160 to analyze.

Upon initiation, program 110 determines the number of nodes in the linked data structure and identifies the linked data structure's parent node. Program 110 then stores the parent node's effective address in DMA list element 116, which is located in DMA list 115. In addition, program 110 sets a notification flag in DMA list element 116 that instructs MFC 125 to stall execution and notify SPU 100 when MFC 125 retrieves parent node data. In one embodiment, each DMA list element includes two fields, which are a transfer size (field 118) and an effective address (field 119). In this embodiment, the notification flag may be one of the bits included in field 118, such as bit 31.

SPU 100 sends GET command 120 to MFC 125, which, in turn, retrieves the parent node effective address from DMA list 115. As such, MFC 125 accesses the parent node effective address in system memory 130 through memory management unit (MMU) 135, retrieves parent node data 140 at a first memory location, and stores parent node data 140 in local store 150. MFC 125 detects that the notification flag was set and, therefore, stalls processing and sends asynchronous event interrupt 155 to SPU 100.

SPU 100 receives asynchronous event interrupt 155 and, in one embodiment, the SPU saves program 110's current program counter (e.g., in register SRR0), disables asynchronous interrupts, and branches to an interrupt vector (e.g., local store 150 offset 0), which is the location of handler 160's software code. Handler 160 retrieves parent node data 140 from local store 150, and compares a node value included in parent node data 140 with search value search value 122, which it receives from program 110. For example, search value 122 may be originally received from a customer service representative that is searching for a customer record corresponding to customer identifier "3284." In this example, the particular node value may correspond to customer identifier "2224's" record. Handler 160 determines if the node value matches search value 122. If the node value matches search value 122, handler 160 informs program 110 and terminates the linked data structure traversal.

On the other hand, if the node value does not match search value 122, handler 160 determines whether search value 122 is greater than or less than the node value. When handler 160 determines that the search value is greater than the node value, handler 160 selects a "right" child node effective address, which is included in parent node data 140, and continues the traversal. When handler 160 determines that the search value is less than the node value, handler 160 selects a "left" child node effective address, which is included in parent node data 140, and continues the traversal (see FIG. 4 and corresponding text for further details regarding child node effective address identification).

The example shown in FIG. 1 shows that handler 160 determined that a "left" child node effective address corresponds to the next node to traverse, and stores the left child node effective address in DMA list element 165 and sets DMA list element 165's notification flag. SPU 100 sends acknowledgement 170 to MFC 125 signifying to MFC 125 to resume "GET" command execution.

In turn, MFC 125 retrieves the left node effective address from DMA list 115, and retrieves corresponding child node data (left node data 180) that includes a child node value from system memory 130 at a second memory location. The first memory location and the second memory location are disjoint. Meaning, the first memory location and the second memory location are not in contiguous memory space. MFC 125 stores left node data 180 in local store 150 and, as discussed above, MFC 125 detects that the notification flag was set in DMA list element 165. As such, MFC 125 stalls processing and sends another asynchronous event interrupt 155 to SPU 100. Handler 160 retrieves left node data 180 from local store 150, and compares its node value with search value 122.

Handler 160 and MFC 125 continue to traverse the linked data structure using asynchronous event interrupts until handler 160 matches a node value with search value 122, at which point program 110 processes the corresponding node data.

Figure 2:
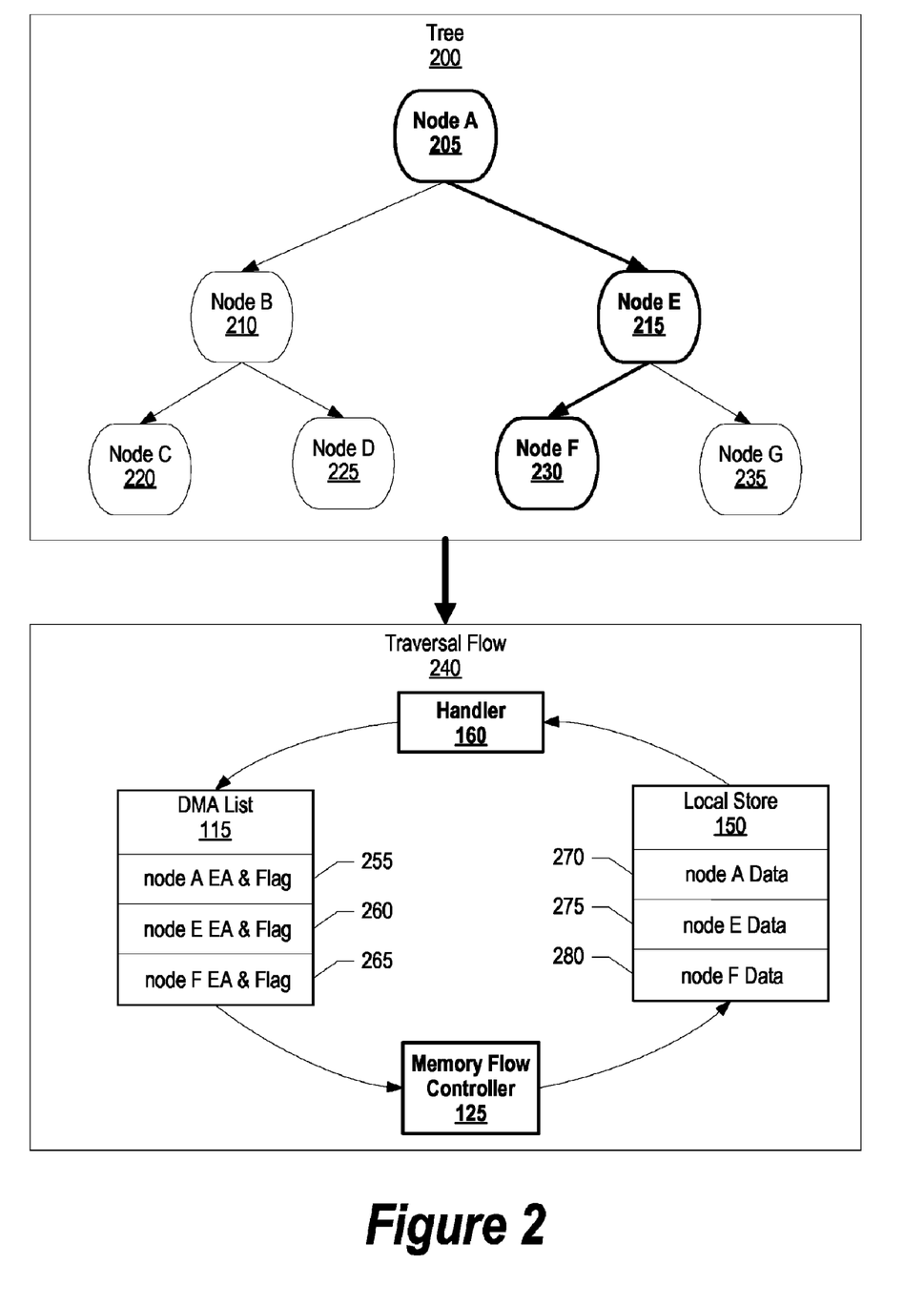
FIG. 2 is a diagram showing a tree traversal and data flow between a memory flow controller and a handler during the tree traversal.

FIG. 2 is a diagram showing a tree traversal and data flow between a memory flow controller and a handler during the tree traversal. FIG. 2 includes tree 200, which is a linked data structure that encompasses nodes 205 through 235. FIG. 2 also includes traversal flow 240, which shows the communication between handler 160 and MFC 125 when they traverse tree 200. During transversal, handler 160 stores node effective addresses in DMA list 115 and MFC 125 stores corresponding node data in local store 150. Handler 160, MFC 125, DMA list 115, and local store 150 are the same as that shown in FIG. 1.

At the commencement of traversing tree 200, a program stores node A 205's effective address 255 in DMA list 115 and sets a notification flag. MFC 125 retrieves node A data 270 corresponding to node A 205, and stores it in local store 150. Handler 160 examines node A data 270 and compares its value to a search value. For example, the search value may be received from a customer service representative that is searching for a customer record corresponding to customer identifier "3284." If the search value equals node data 205's value, then handler 160 signifies the search is complete.

If the search value is less than node data 205's value, then handler 160 traverses "left" and handler 160 copies the node's "left" pointer into the next element in the DMA list and acknowledges the asynchronous event interrupt. If the search value is greater than node data 205's value, then handler 160 traverses "right" and handler 160 copies the node's "right" pointer into the next element in the DMA list and acknowledges the asynchronous event interrupt.

The example in FIG. 2 shows that the search value is greater than the node A 205's value and, therefore, handler 160 stores node E 215's effective address 260 in DMA list 115 and sets its corresponding notification flag. In turn, MFC 125 stores node E data 275 in local store 150, which handler 160 analyzes. The example shown in FIG. 2 shows that the search value is less than node E 215's value and, therefore, handler 160 stores node F 230's effective address 265 in DMA list 115. As such, MFC 125 stores node F data 280 in local store 150, which handler 160 analyzes. This This cyclical information exchange continues until handler 160 matches a node value with a search value or until handler 160 signifies a failed search (see FIG. 4 and corresponding text for further details regarding handler analysis).

Figure 3:
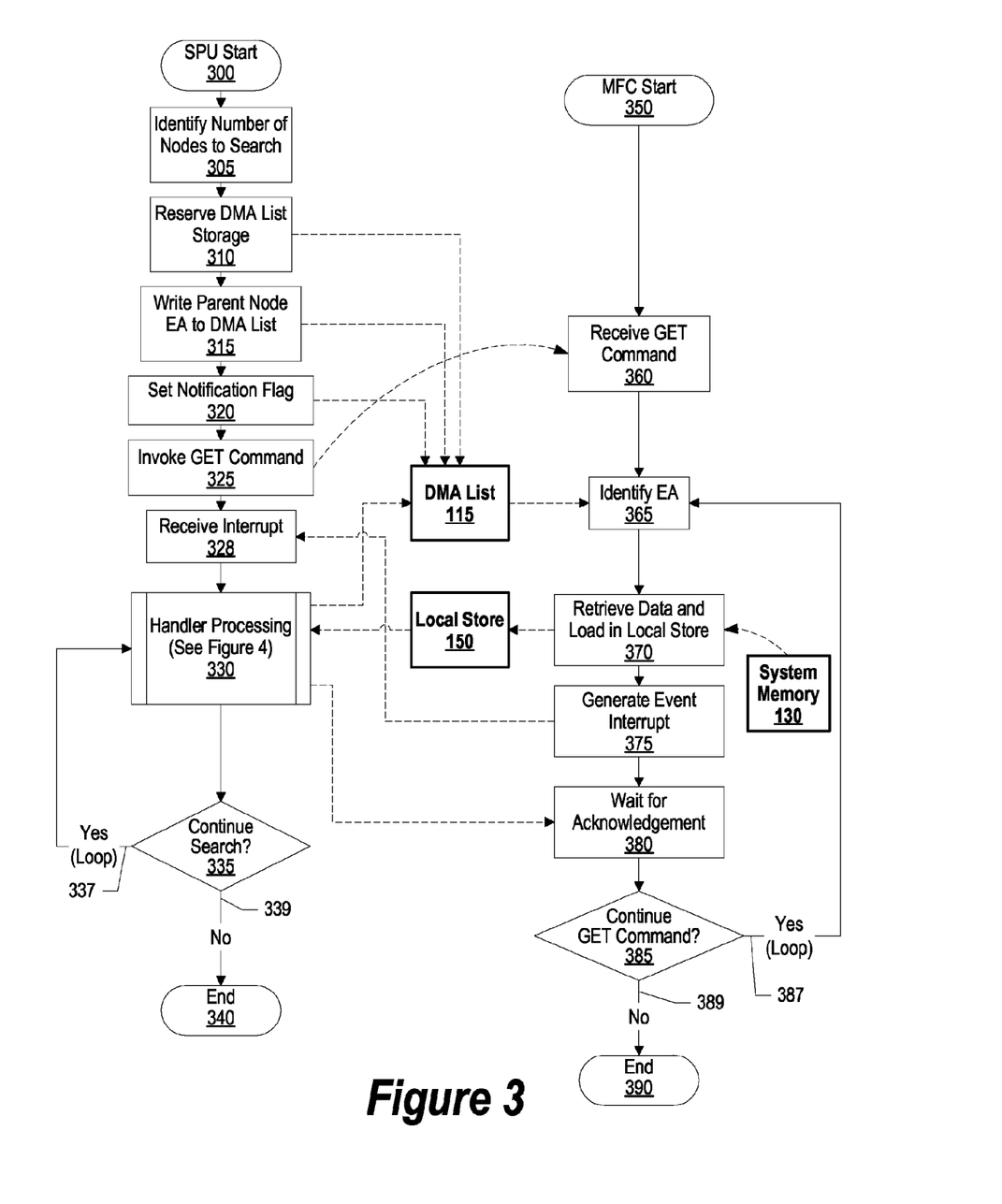
FIG. 3 is a flowchart showing steps taken in a synergistic processing unit (SPU) interfacing with a memory flow controller (MFC) to traverse a linked data structure.

FIG. 3 is a flowchart showing steps taken in a synergistic processing unit (SPU) interfacing with a memory flow controller (MFC) to traverse a linked data structure. The SPU includes a program that initiates traversing a linked data structure and a handler that works in conjunction with the MFC to asynchronously traverse the linked data structure.

SPU processing commences at 300, whereupon the SPU identifies the number of nodes to search in the linked data structure (step 305). At step 310, the SPU reserves memory space in DMA list 115 that includes a number of DMA list elements corresponding to the number of nodes that were identified in the linked data structure. Then, the SPU writes the linked data structure's parent node effective address to the first DMA list element in DMA list 115 (step 315). DMA list 115 is the same as that shown in FIG. 1.

The SPU sets a notification flag (e.g. stall-and-notify flag) in the DMA list element that includes the parent node effective address in order to instruct the MFC that, once it loads parent node data, to "stall" and "notify" the SPU (step 320). In one embodiment, each DMA list element includes two fields, which are a transfer size and an effective address (EA). In this embodiment, the notification flag may be a bit in the transfer size field, such as bit 31. At step 325, the SPU invokes a "GET" command that instructs the MFC to retrieve data from system memory that corresponds to the parent node effective address.

MFC processing commences at 350, whereupon the MFC receives the "GET" command from the SPU at step 360. At step 365, the MFC identifies the parent node effective address that is located in DMA list 115. The MFC uses the identified effective address to retrieve parent node data from system memory 130, and loads the parent node data in local store 150 (step 370). System memory 130 and local store 150 are the same as that shown in FIG. 1. Since the notification flag was set by the SPU, the MFC generates an asynchronous event interrupt (step 375) and waits for an acknowledgement from the SPU (step 380).

Figure 4:
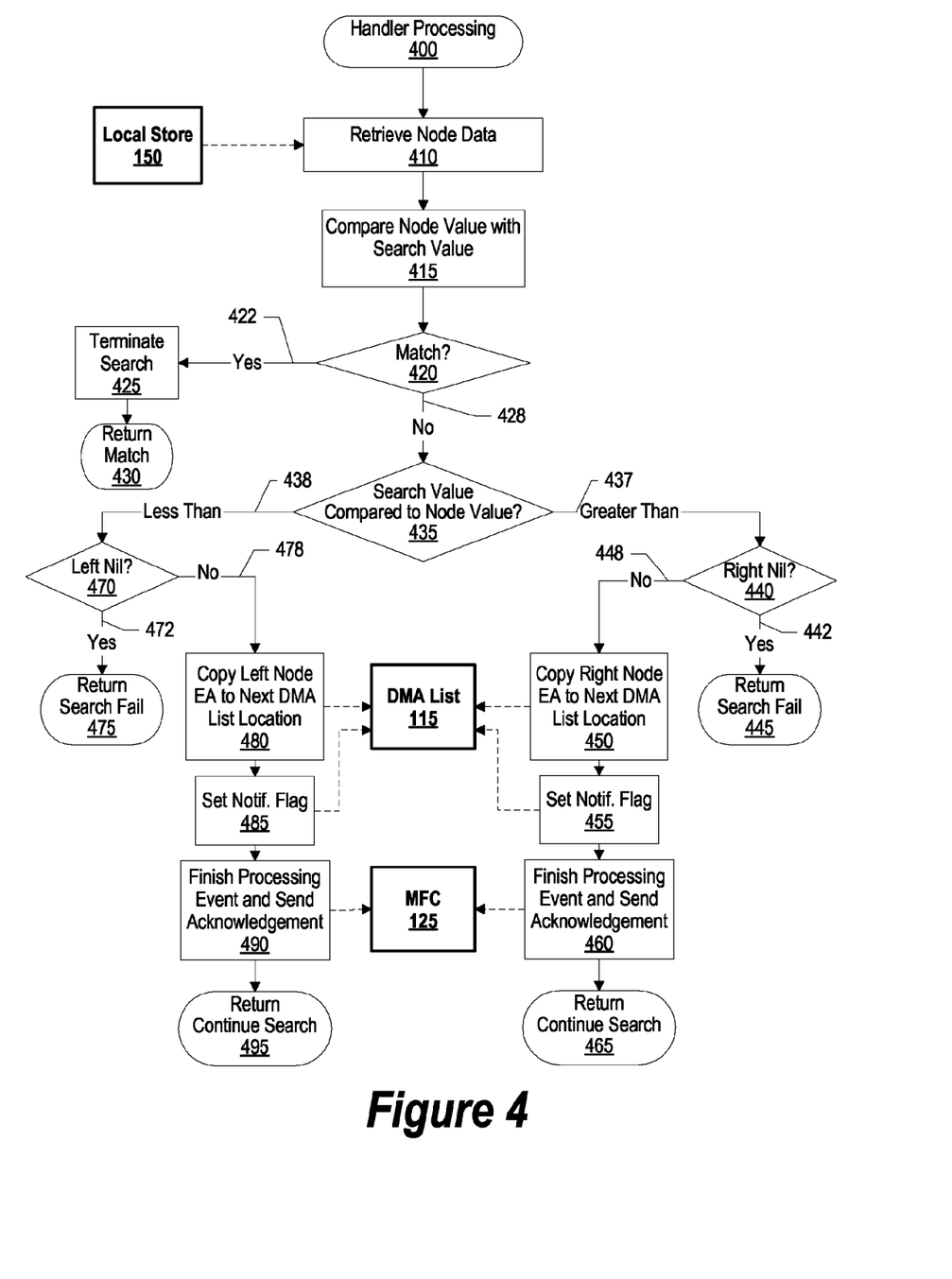
FIG. 4 is a flowchart showing steps taken in a handler comparing a search value with a node data value.

The SPU receives the asynchronous event interrupt at step 328, and invokes a handler to process the interrupt (predefined process block 330, see FIG. 4 and corresponding text for further details). In one embodiment, when the SPU receives the interrupt, the SPU saves the current program counter (e.g., in register SRR0), disables asynchronous interrupts, and branches to an interrupt vector (e.g., local store 150 offset 0), which is the location of the handler software code. The handler acknowledges the interrupting condition and executes a "return from interrupt" instruction, which causes the SPU to 1) branch back to the location previously saved in SRR0, 2) re-enable asynchronous interrupts, and 3) send an acknowledgement to the MFC, which it receives at step 380.

On the SPU, a determination is made as to whether to continue to traverse the linked data structure (decision 335). For example, the handler may have determined that the node data's value did not match a search value and, therefore, the handler stored a child node effective address in DMA list 115 for the next traversal. If the SPU should continue to traverse the linked data structure, decision 335 branches to "Yes" branch 337 which loops back to invoke the handler to compare child node data corresponding to the child node effective addresses with the search value. This looping continues until the handler matches a node value with the search value, or until the handler signifies a failed search, at which point decision 335 branches to "No" branch 339 whereupon processing ends at 340.

On the MFC, a determination is made as to whether to continue executing the "GET" command (decision 385) based upon whether the handler matched the node data's value to the search value. If the MFC should continue to execute the "GET" command, decision 385 branches to "Yes" branch 387 which loops back to identify the next effective address that was loaded in DMA list 115 by the handler. This looping continues until the MFC should terminate the GET command, at which point decision 385 branches to "No" branch 389 whereupon MFC processing ends at 390.

FIG. 4 is a flowchart showing steps taken in a handler comparing a search value with a node data value. The handler examines node data and determines whether (a) there is a match between the node value and the search value, (b) the search should traverse left in the tree if the search value is less than the node value, or (c) the search should traverse right in the tree if the search value value is greater than the node value. Once the handler determines how to proceed, it acknowledges an asynchronous event interrupt and executes a "return from interrupt" instruction.

Handler processing commences at 400, whereupon the handler retrieves the node data from local store 150 at step 410. A memory flow controller (MFC) previously stored the node data in local store 150 using a corresponding effective address (see FIG. 3 and corresponding text for further details). At step 415, the handler compares a node value that is included in the node data with a search value. For example, the search value may be received from a customer service representative that is searching for a customer record corresponding to customer identifier "3284." In this example, the particular node value may correspond to customer identifier "2224's" record.

A determination is made as to whether the node value matches the search value (decision 420). If the node value matches the search value, decision 420 branches to "Yes" branch 422 whereupon the handler terminates the search (step 425) and returns a match at 430. In turn, the SPU processes the node data whose value matched the search value.

On the other hand, if the node value does not match the search value, decision 420 branches to "No" branch 428 whereupon a determination is made as to whether the search value is greater than or less than the node value (decision 435). If the search value is greater than the node value, indicating that the handler should traverse the linked data structure to the "right", decision 435 branches to "greater than" branch 437 whereupon a determination is made as to whether the node data includes a child node effective address corresponding to a right node (decision 440).

If the node data does not include a child node effective address for a right node (right node effective address), decision 440 branches to "Yes" branch 442 whereupon the handler returns a search fail to the SPU at 445. On the other hand, if the node data includes a right node effective address, decision 440 branches to "No" branch 448 whereupon the handler copies the right node effective address to the next available DMA list element in DMA list 115 at step 450, and sets a corresponding notification flag (step 455). At step 460, the handler executes a "return from interrupt" instruction and sends an acknowledgement to MFC 125. Handler processing returns a continue search at step 465. DMA list 115 and MFC 125 is the same as that shown in FIG. 1.

On the other hand, if the search value is less than the node value, indicating that the handler should traverse the linked data structure to the "left", decision 435 branches to "less than" branch 438 whereupon a determination is made as to whether the node data includes a child node effective address corresponding to a left node (decision 470).

If the node data does not include a child node effective address for a left node (left node effective address), decision 470 branches to "Yes" branch 472 whereupon the handler returns a search fail to the SPU at 475. On the other hand, if the node data does include a left node effective address, decision 470 branches to "No" branch 478 whereupon the handler copies the left node effective address to the next available DMA list element in DMA list 115 at step 480, and sets a corresponding notification flag (step 485). At step 490, the handler executes a "return from interrupt" instruction and sends an acknowledgement to MFC 125. Handler processing returns a continue search at step 495.

Figure 5:
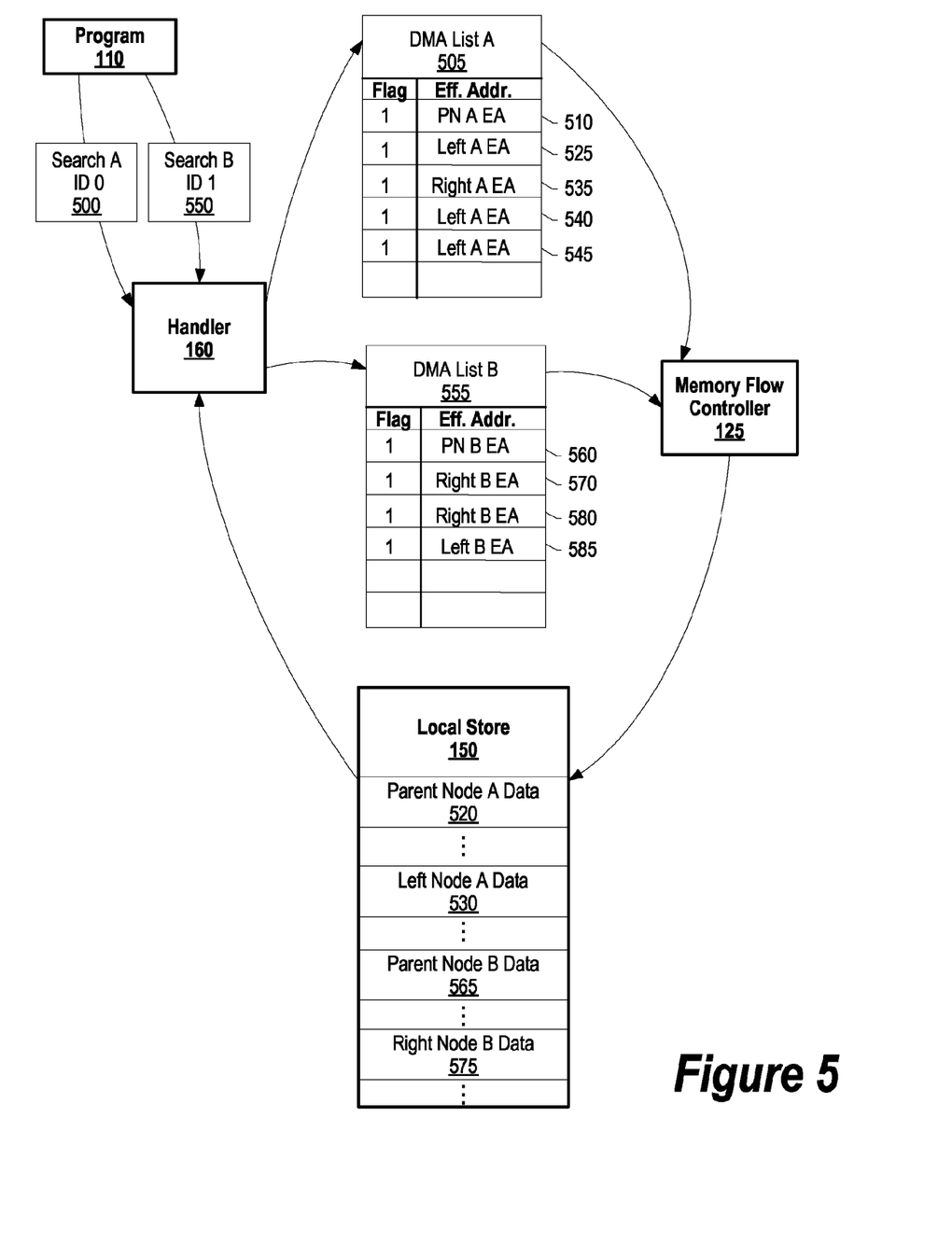
FIG. 5 is a diagram showing a handler processing multiple traversal tasks.

FIG. 5 is a diagram showing a handler processing multiple traversal tasks. Multiple traversals may be implemented using a specific tag group identifier for each traversal. For example, a first search may issue commands with a "tagid=0" and a second search may issue commands with a "tagid=1."

In one embodiment, an SPU stall-and-notify status bit (e.g., channel 25) indicates the tag group causing an event. In this embodiment, the handler reads the channel in order to determine which search caused the stall-and-notify event. When multiple traversals occur concurrently, duplicate states are maintained for each traversal and separate DMA lists, "current node" counters, and node data may be used.

The example shown in FIG. 5 shows that program 110 is concurrently executing two traversals, which correspond to "tag group identifier 0" and "tag group identifier 1." Program 110 invokes search A 500 and sets its tag group identifier to "0." As such, for each asynchronous event interrupt corresponding to tag group identifier 0 that handler 160 receives from MFC 125, handler 160 stores effective addresses in DMA list A 505 (i.e. DMA list elements 510 through 545). MFC 125 stores corresponding node data, such as parent node A data 520 and left node A data 530, in local store 150. MFC 125, program 110, local store 150, and handler 160 are the same as that shown in FIG. 1.

Program 110 also invokes search B 550 and sets its tag group identifier to "1." As such, for each asynchronous event interrupt corresponding to tag group identifier 1 that handler 160 receives from MFC 125, handler 160 stores effective addresses in DMA list B 555 (i.e. DMA list elements 560 through 585). MFC 125 stores corresponding node data, such as parent node B data 565 and right node B data 575, in local store 150.

Figure 6:
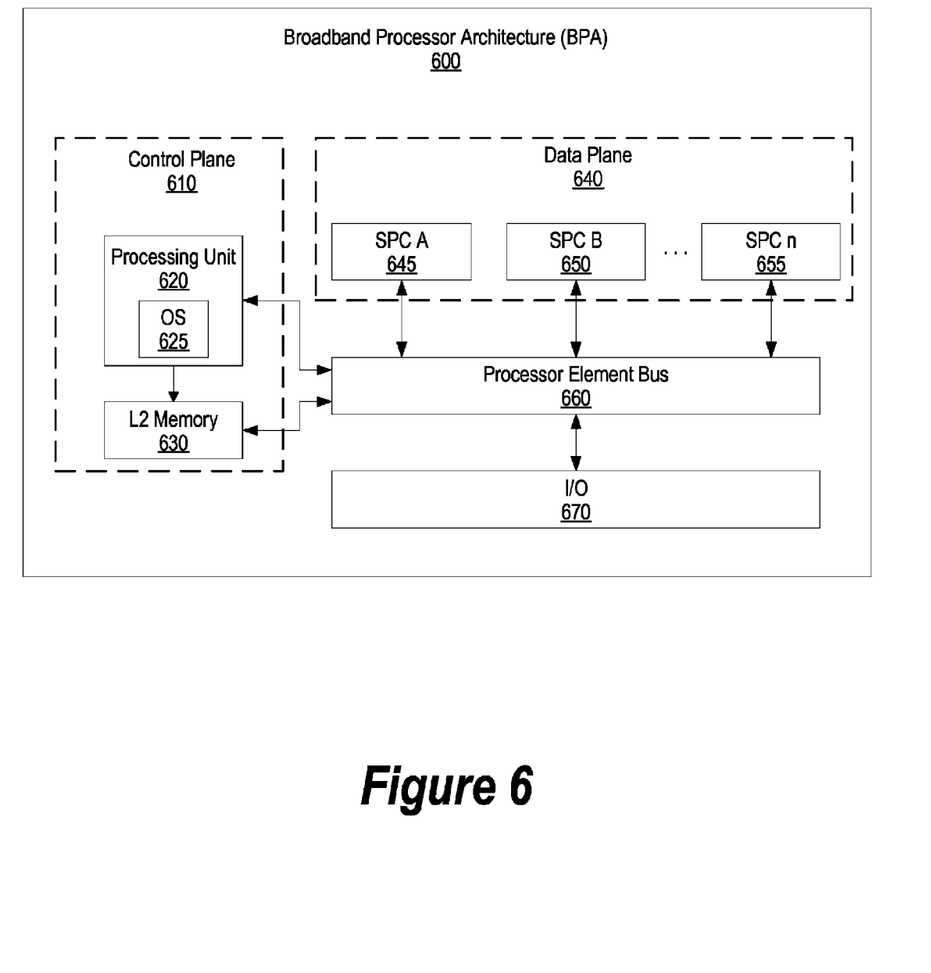
FIG. 6 is a block diagram of a computing device capable of implementing the present invention.

FIG. 6 is a diagram showing a block diagram of a broadband processor architecture, which is a computing device capable of implementing the present invention. BPA 600 includes a plurality of heterogeneous processors, a common memory, and a common bus. The heterogeneous processors are processors with different instruction sets that share the common memory and the common bus. For example, one of the heterogeneous processors may be a digital signal processor and the other heterogeneous processor may be a microprocessor, both sharing the same memory space.

BPA 600 sends and receives information to/from external devices through input output 670, and distributes the information to control plane 610 and data plane 640 using processor element bus 660. Control plane 610 manages BPA 600 and distributes work to data plane 640.

Control plane 610 includes processing unit 620, which runs operating system (OS) 625. For example, processing unit 620 may be a Power PC core that is embedded in BPA 600 and OS 625 may be a Linux operating system. Processing unit 620 manages a common memory map table for BPA 600. The memory map table corresponds to memory locations included in BPA 600, such as L2 memory 630 as well as non-private memory included in data plane 640.

Data plane 640 includes Synergistic Processing Complex's (SPC) 645, 650, and 655. Each SPC is used to process data information and each SPC may have different instruction sets. For example, BPA 600 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU). An SPU is preferably a single instruction, multiple data (SIMD) processor, such as a digital signal processor, a microcontroller, a microprocessor, or a combination of these cores. In a preferred embodiment, each SPU includes a local memory, registers, four floating point units, and four integer units. However, depending upon the processing power required, a greater or lesser number of floating points units and integer units may be employed.

SPC 645, 650, and 655 are connected to processor element bus 660, which passes information between control plane 610, data plane 640, and input/output 670. Bus 660 is is an on-chip coherent multi-processor bus that passes information between I/O 670, control plane 610, and data plane 640. Input/output 670 includes flexible input-output logic which dynamically assigns interface pins to input output controllers based upon peripheral devices that are connected to BPA 600. For example, BPA 600 may be connected to two peripheral devices, such as peripheral A and peripheral B, whereby each peripheral connects to a particular number of input and output pins on BPA 600. In this example, the flexible input-output logic is configured to route BPA 600's external input and output pins that are connected to peripheral A to a first input output controller and route BPA 600's external input and output pins that are connected to peripheral B to a second input output controller.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer program product comprising:
    a computer readable storage medium having computer readable program code embodied therewith, the computer readable program code comprising:
    computer readable program code configured to identify a number of nodes to search in a linked data structure;
    computer readable program code configured to reserve a plurality of direct memory access list elements corresponding to the identified number of nodes in which to search, wherein each direct memory access list element includes a transfer size field and an effective address field;
    computer readable program code configured to store a parent node effective address in a first effective address field included in a first direct memory access list element;
    computer readable program code configured to set a first notification flag located in a first transfer size field included in the first direct memory access list element;
    computer readable program code configured to invoke a memory flow controller to retrieve parent node data located at the parent node effective address;
    computer readable program code configured to retrieve the parent node data by the memory flow controller in response to the invoking;
    computer readable program code configured to store, by the memory flow controller, the parent node data in a first storage location;
    computer readable program code configured to receive an asynchronous event interrupt from the memory flow controller;
    computer readable program code configured to stall execution at the memory flow controller in response to detecting that the first notification flag is set;
    computer readable program code configured to retrieve the parent node data corresponding to the parent node effective address from the first storage location in response to receiving the asynchronous event interrupt, the parent node data included in the linked data structure;
    computer readable program code configured to determine whether a node value included in the parent node data matches a search value;
    computer readable program code configured to store a child node effective address that corresponds to a second memory location in a second effective address field included in a second direct memory access list element included in the plurality of direct memory access list elements in response to determining that the node value included in the parent node data does not match the search value, the child node effective address included in the parent node data;
    computer readable program code configured to set a second notification flag that corresponds to the child node effective address, the second notification flag located in a second transfer size field included in the second direct memory access list element;
    computer readable program code configured to re-invoke the memory flow controller to retrieve child node data located at the child node effective address;
    computer readable program code configured to retrieve the child node data by the memory flow controller in response to the re-invoking;
    computer readable program code configured to store, by the memory flow controller, the child node data in a second storage location; and
    computer readable program code configured to stall execution at the memory flow controller in response to detecting that the second notification flag is set.

2. The computer program product of claim 1 wherein the first memory location and the second memory location are disjoint and separately allocated in memory space.

3. The computer program product of claim 1 further comprising:

computer readable program code configured to determine whether the node value is greater than or less than the search value;

wherein the child node effective address corresponds to a child node value that is less than the node value if it was determined that the search value is less than the node value; and wherein the child node effective address corresponds to a child node value that is greater than the node value if it was determined that the search value is greater than the node value.

4. An information handling system comprising:

one or more processors;

a memory accessible by the processors;

one or more nonvolatile storage devices accessible by the processors; and a traversing tool for traversing a linked data structure, the traversing tool being configured to:
  identify a number of nodes to search in the linked data structure;
  reserve a plurality of direct memory access list elements in the memory corresponding to the identified number of nodes in which to search, wherein each direct memory access list element includes a transfer size field and an effective address field;
  store a parent node effective address in a first effective address field included in a first direct memory access list element;
  set a first notification flag located in a first transfer size field included in the first direct memory access list element;
  invoke a memory flow controller to retrieve parent node data located at the parent node effective address;
  in response to the invoking, retrieve the parent node data by the memory flow controller;
  store, by the memory flow controller, the parent node data in a first storage location;
  receive an asynchronous event interrupt from the memory flow controller;
  stall execution at the memory flow controller in response to detecting that the first notification flag is set;
  retrieve the parent node data from one of the nonvolatile storage devices corresponding to the parent node effective address from the first storage location in response to receiving the asynchronous event interrupt, the parent node data included in the linked data structure;
  determine whether a node value included in the parent node data matches a search value;
  in response to determining that the node value included in the parent node data does not match the search value, store a child node effective address in the memory that corresponds to a second memory location in a second effective address field included in a second direct memory access list element included in the plurality of direct memory access list elements, the child node effective address included in the parent node data;
  set a second notification flag that corresponds to the child node effective address, the second notification flag located in a second transfer size field included in the second direct memory access list element;
  re-invoke the memory flow controller to retrieve child node data located at the child node effective address;
  in response to the re-invoking, retrieve the child node data by the memory flow controller;
  store, by the memory flow controller, the child node data in a second storage location; and
  stall execution at the memory flow controller in response to detecting that the second notification flag is set.

5. The information handling system of claim 4 wherein the first memory location and the second memory location are disjoint and separately allocated in memory space.

6. The information handling system of claim 4 wherein the traversing tool is further configured to:
  determine whether the node value is greater than or less than the search value;
  wherein the child node effective address corresponds to a child node value that is less than the node value if it was determined that the search value is less than the node value; and
  wherein the child node effective address corresponds to a child node value that is greater than the node value if it was determined that the search value is greater than the node value.

* * * * *